T. DOUGLAS.
POWER VEHICLE GOVERNOR.
APPLICATION FILED OCT. 21, 1912.
1,078,337.
Patented Nov. 11, 1913.
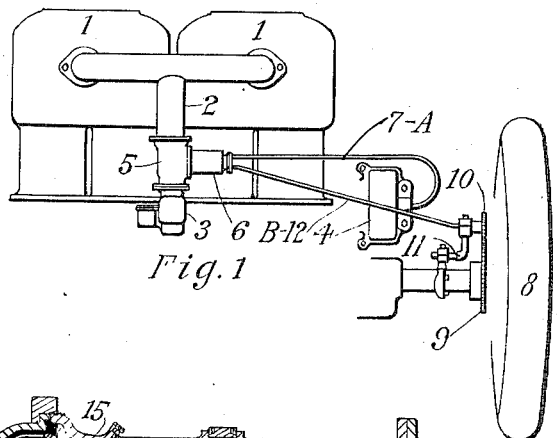
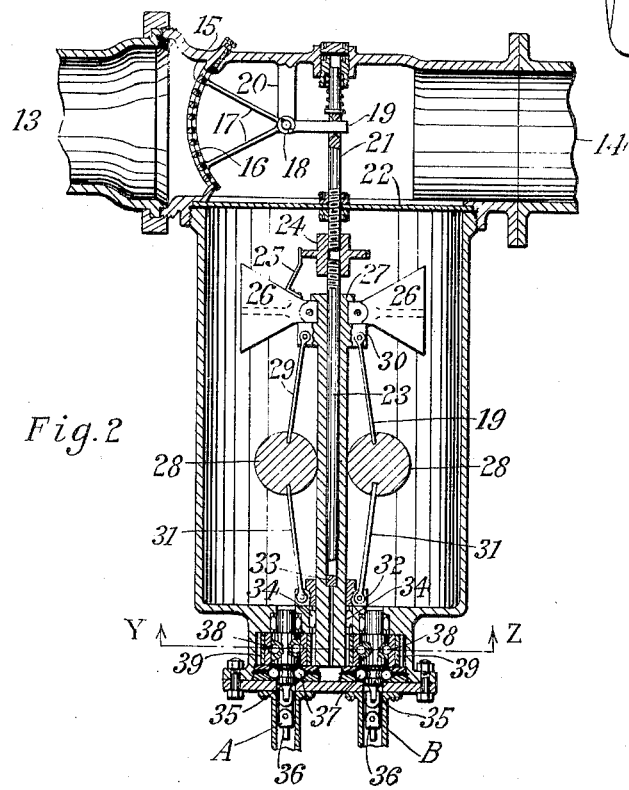
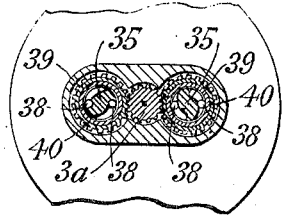
WITNESSES:
INVENTOR

UNITED STATES PATENT OFFICE.

THEODORE DOUGLAS, OF SCARBORO, NEW YORK.

POWER-VEHICLE GOVERNOR.

1,078,337.     Specification of Letters Patent.     Patented Nov. 11, 1913.

Application filed October 21, 1912. Serial No. 726,968.

*To all whom it may concern:*

Be it known that I, THEODORE DOUGLAS, a citizen of the United States, and resident of Scarboro, county of Westchester, and State of New York, have made a new and useful Invention in Power-Vehicle Governors, of which the following is the specification.

The present invention relates to speed governors and more particularly to a speed governor designed to control the speed of power driven vehicles.

In a co-pending application filed on the 4th day of May, 1912, Serial #695,296, I have disclosed a speed governor in which the control of the speed of a moving vehicle in excess of a predetermined maximum speed is accomplished by automatic mechanism controlling the fuel or fluid supply to the engine, by a valve located in the intake manifold thereto, which valve is automatically closed by means driven from some part of the moving mechanism of the vehicle, when the speed of the vehicle exceeds a predetermined maximum speed. And it is also desirable to independently control the maximum speed of the motor when running idle or disconnected from the vehicle, by a controller means driven by itself and which may also effect a control of the speed of the vehicle when the motor is connected thereto.

The object of the present invention is therefore to provide a double means of controlling both the speed of the vehicle through the motor, and the speed of the motor through the vehicle, or independently thereof. This is accomplished through instrumentalities operated from the vehicle and other supplemental instrumentalities operated from the motor itself, these instrumentalities being so constructed and so assembled in their relationships to each other and to the propelling motor, and to the propelled vehicle, that whichever of these instrumentalities at any given time is operating at an excessive speed, that instrumentality will bring into operation a control of the speed of the motor or the speed of the vehicle.

To the above ends the present invention consists of a motor, a speed controller, and independently operating mechanisms for actuating the speed controller from the motor, or from the driven load.

The present invention further consists of a motor, means to control the fluid or fuel supply thereto, and means whereby the fluid or fuel supply control is operated by a moving part of the motor itself or the driven load, whichever may be operating at a speed exceeding a predetermined maximum speed.

The invention further consists of means for controlling the fluid or fuel supply to a motor, comprising means operated by the motor itself, and means operated by the driven load, and means for automatically coupling the fluid or fuel supply control to the motor, or to the driven load, according as the one or the other is operating at a speed in excess of a predetermined maximum speed.

The present invention further consists of the devices and combinations of devices which will be hereinafter described and claimed.

The invention is shown in the accompanying drawing in which—

Figure 1 is an elevation showing diagrammatically a motor with the speed regulator connected thereto, and to the wheel of a moving vehicle; Fig. 2 is a longitudinal sectional view through the regulator; and Fig. 3 is a sectional view taken on the line Y—Z of Fig. 2 showing the independent clutch connections between the flexible shafts and the speed regulating mechanism.

The invention is shown in the accompanying drawing, in connection with an explosive engine, in which—

1 represents an ordinary four-cylinder gasolene engine, 2 represents the intake manifold, and 3 a carbureter. Between the manifold 2 and the carbureter 3 is located means 5 for controlling the fluid or fuel supply, which means in the apparatus of the drawing consists of a suitable valve mechanism, comprising a fixed grid 15 and a movable grid 16, these grids being formed on an arc of a circle struck from the pivotal point 18. The movable grid 16 is carried by the arms 17 of the lever pivotally supported at 18 upon a bracket 20. An arm 19 of the lever is engaged by means which will be hereinafter described, whereby the said lever is rocked about its pivot 18 to cause the movable grid 16 to move in the arc of a circle in contact with the fixed grid 15 to more or less close the slots through which the fluid or fuel passes from the carbureter to the manifold intake. The valve just described is specifically claimed in a co-pending application, filed by me on the 7th day of December, 1912, Serial #735,432, and in and of itself forms no part of the present invention. Like the speed control set forth in my application No. 695,296, filed on the 4th day of May, 1912, the valve in the present case is inclosed in a valve chamber having a movable wall composed of a flexible diaphragm 22, by which the movements of the actuating mechanism are transmitted to the valve as will be hereinafter particularly set forth.

Projecting laterally from the valve chamber 5 is a cylindrical casing 6 which at one end is closed by the movable diaphragm 22, and at its opposite end is provided with a bearing, preferably a roller bearing 34, in which is mounted one end of a hollow shaft 27, the said shaft being supported at its opposite end in a bearing mounted on a support 26 within the casing 6. The hollow shaft 27 is free to rotate, and it is provided with a longitudinal bore within which is received a rod 23, which by means of an adjustable coupling 24 is connected to a rod 21 which is secured to the movable diaphragm 22. The rod 21 at its free end is seated in a bearing upon the inner surface of the valve chamber, and it is provided with an opening which receives the arm 19 of the lever carrying the movable grid 16. The adjustable connections 24 may be turned to adjust the length of the rod 23, and it is held in adjusted position by a spring detent 25. A movement of the diaphragm 22 upward as the device is shown in Fig. 2 causes the lever 17 to be rocked to impart movement to the movable grid 16. A spring 219 is employed to supplement the resistance to movement of the rod 21 inherent in the flexible diaphragm 22. Connected to the hollow rotary shaft 27 is a governor formed of the balls 28 and the springs 31, 19 and 29, the springs 19 and 29 being pivotally connected to the collar 30 forming a part of the shaft 27, and the springs 31 being connected to a movable collar 32 carrying a cross bar 33 which passes through a slot cut in the hollow shaft 27 in position to engage the end of the rod 23 when the weights 28 move radially away from the axis of rotation and thus cause a longitudinal movement of the collar 32 along the shaft 27.

The foregoing arrangement is such that an excessive speed of rotation of the hollow shaft 27 will cause the governor balls to move radially away from the axis of rotation and impart a longitudinal movement to the collar 32 carrying the cross bar 33, to engage the end of the rod 23 and through that rod and operating through the flexible diaphragm 22, rock the lever 17 to close the grid valve, and thus diminish the supply of gasolene or other fluid to the engine, causing the engine to slow down.

While the mechanism just described is the preferred form, it is well to state that the present invention is not restricted thereto and does not reside in any particular form of valve or any particular form of means for operating the valve, but resides in the means which will now be described whereby the operation of the motor may be controlled by independent connections between the controlling means and a rotary part of the driven load, as for instance the wheel of an automobile, and a rotary part of the motor itself or some accessory of the motor. To secure this result, the hollow shaft 27 is provided at its outer end with a gear $3^a$ which meshes with gears 39, within which are received cam blocks 35 supported by ball bearings 37, and these cam blocks 35 coöperate with balls 38 whereby when they are turned in one direction, they will pick up and cause a corresponding turning of the gears 39, but permitting the gears and cam blocks to have a relative movement to each other in the opposite direction. The respective cam blocks 35 are connected to flexible shafts 36, and one flexible shaft carries a pinion 10 supported by a bracket 11 and engages a gear 9 attached to the hub of the wheel 8 and the other flexible shaft is connected to a rotary part of the motor, for instance, to the shaft of the pump 4.

It is to be observed that the gears 39 are at all times in mesh with the pinion $3^a$ carried by the end of the hollow shaft 27, and that said hollow shaft is arranged to be rotated by either of the hollow gears 39, or that one of the gears 39 which at any given time is driven at a speed exceeding the predetermined maximum speed, at which time the other gear 39 will turn loosely in a reverse direction, the arrangement being such that the clutch connections between the gears and the flexible shafts will at all times automatically couple the flexible shaft which is moving at an excess speed to its gear and automatically permit the uncoupling and the loose running of the other gear.

The operation of the apparatus is as follows: Assuming that the apparatus is connected as shown in Fig. 1, so as to require the passage of all of the explosive gas of the engine through the valve chamber, and that one of the flexible shafts is connected to some rotating part of the motor, the speed of the motor will be imparted through that shaft by its clutch connection to the hollow shaft 27, and in like manner, one of the flexible shafts is connected to the wheel of the automobile, so that its speed will be communicated to the hollow shaft 27 through the other clutch connection. When the engine is operating normally with or without load, the flexible shaft which at that time may be traveling at a greater speed than the other, will engage and drive the hollow shaft 27 and the governor mounted thereon. Should the maximum engine speed be exceeded or the maximum speed of the driven load or vehicle be exceeded, the rotary shaft 27 will be rotated at such a speed as will cause the governor to move the collar 32 along the said shaft, operating the valve mechanism as described to reduce the fluid or fuel supply to the engine or motor. Thus it will be seen that when the motor and vehicle are both moving, the flexible shaft which is driven at the highest speed will through its clutch connection engage and drive the hollow shaft 27 and the governor, without interfering with the face rotation of the loose gear of the other clutch connection. In short, in the arrangement shown and described, there is provided independent means whereby an excess of speed in the engine or vehicle, will automatically operate the valve mechanism to reduce the supply of fuel to the engine, and the arrangement is such that even though the vehicle be stopped or backed, it will not interfere with the controlling connection operated by the motor or engine itself.

It will be noted that the method of control set forth offers many advantages in power vehicle design in that it provides the vehicle with a controller which on high gear will effectively limit the maximum vehicle speed to a relatively low engine speed and a correspondingly normal horse power development of the engine and on lower gears will limit the speed of the vehicle to a maximum desirable engine speed for which the governor has been set, thus permitting the engine on these low gears, where a greater horse power development is required, to develop a higher engine speed and hence a greater horse power, which higher engine speed and horse power would be destructive to the life of the vehicle were it made permissible to propel the vehicle at these high engine speeds on high gear. Thus it is made possible to utilize the maximum possible horse power development of the motor on all gears where high horse power is required, and still to limit the maximum speed of the vehicle on high gear to a relatively low engine speed, thus materially increasing the maximum tonnage and general efficiency of the vehicle and at the same time safe-guarding it against excessive vehicle speeds and a shortened life.

I claim:

1. In combination, a motor, a rotary load element driven by said motor, means for controlling the supply of fluid or fuel to said motor, and independently operating driving connections between both the motor and the rotary load element and the means for controlling the fluid or fuel supply.

2. In combination, a motor, a rotary load element driven by said motor, a governor controlling the speed of said motor, and independently operating driving connections between said motor and governor and said rotary load element and governor.

3. In combination, a gas engine, a rotary load element driven by said gas engine, a governor, means operated by the governor for regulating the fuel supply to said gas engine, and independently operating driving connections between said gas engine and the governor and the rotary load element and the governor.

4. In combination, a gas engine, a vehicle propelled by said engine, a fuel supply regulator, independently operating connections between the engine and said fuel supply regulator, and a moving part of the vehicle and said fuel supply regulator, and means for automatically coupling that one of the connections which may be rotating at the greater speed.

5. In combination, a gas engine, a vehicle propelled by said engine, a fuel supply regulator, means normally disconnected for operating said fuel supply regulator, and independently operating driving connections between a part of said engine and a wheel of the moving vehicle for connecting said operating means of the fuel supply regulator.

6. In combination, a gas engine, a vehicle propelled by said engine, a fuel supply regulator, a rotary element for operating said regulator, a plurality of driving connections for said rotary element, and automatically operated clutch devices for connecting one or the other of said driving connections with the rotary element.

7. A coördinating and controlling governor for multiple speed units, consisting of means to curtail the impelling power of each speed unit, transmission means for imparting to the governor means a speed proportionate to the speed of each speed unit, and interconnecting conveying speed means between the several speed units and the imparting means.

In testimony whereof I affix my signature in presence of two witnesses.

THEODORE DOUGLAS.

Witnesses:
HARRY W. LICHTENSTEIN,
J. F. COOPER.